(12) United States Patent
Trevett et al.

(10) Patent No.: US 10,150,143 B2
(45) Date of Patent: Dec. 11, 2018

(54) APPARATUS AND METHOD FOR CLEARING WATER FROM A WINDOW

(71) Applicant: EchoVista GmbH, Seligenstadt (DE)

(72) Inventors: David Trevett, Poole (GB); Patrick Trevett, Poole (GB); Hendrik Faustmann, Öhringen (DE)

(73) Assignee: EchoVista GmbH, Seligenstadt (DE)

(*) Notice: Subject to any disclaimer, the term of this patent is extended or adjusted under 35 U.S.C. 154(b) by 259 days.

(21) Appl. No.: 15/003,511

(22) Filed: Jan. 21, 2016

(65) Prior Publication Data

US 2016/0137166 A1  May 19, 2016

Related U.S. Application Data

(63) Continuation of application No. PCT/EP2014/065691, filed on Jul. 22, 2014.

(30) Foreign Application Priority Data

Jul. 22, 2013  (GB) .................................. 1313061.2

(51) Int. Cl.
*B08B 7/02* (2006.01)
*B60S 1/02* (2006.01)
*B60S 1/08* (2006.01)

(52) U.S. Cl.
CPC ................ *B08B 7/028* (2013.01); *B60S 1/02* (2013.01); *B60S 1/0818* (2013.01)

(58) Field of Classification Search
CPC ........... B08B 7/028; B60S 1/02; B60S 1/0818
See application file for complete search history.

(56) References Cited

U.S. PATENT DOCUMENTS 4,483,571 A    11/1984  Mishiro
5,801,307 A *   9/1998  Netzer .............. B32B 17/10036
                                              73/170.17

(Continued)

FOREIGN PATENT DOCUMENTS

CN    201745541 U    2/2011
CN    103191886 A    7/2013

(Continued)

OTHER PUBLICATIONS

International Search report and Written Opinion dated Nov. 14, 2014 for related Application No. PCT/EP2014/065559, filed Jul. 18, 2014.

(Continued)

*Primary Examiner* — Jason Y Ko
*Assistant Examiner* — Cristi J Tate-Sims

(57) ABSTRACT

An apparatus for clearing water from a window comprises one or more transducers for coupling to a window. Each of the one or more transducers is operable at any selected one of a plurality of different frequencies to generate respective wave-types. A frequency generator (925) provides ultrasonic drive signals (926) to the one or more transducers for the plurality of different frequencies. A mode controller (930) controls the generator (925) and transducer configuration of electrodes (210) to apply to the window ultrasonic waves of any selected frequency and wave-type from the plurality of different frequencies and wave-types.

14 Claims, 14 Drawing Sheets

(56) References Cited

U.S. PATENT DOCUMENTS

| | | | | |
|---|---|---|---|---|
| 5,920,167 A | * | 7/1999 | Wiget | ............ B60S 1/0818 |
| | | | | 318/444 |
| 2002/0079089 A1 | | 6/2002 | Kang et al. | |
| 2008/0100584 A1 | | 5/2008 | Hague et al. | |
| 2008/0107542 A1 | | 5/2008 | Hernandez | |
| 2013/0024169 A1 | | 1/2013 | Veerasamy | |

FOREIGN PATENT DOCUMENTS

| | | |
|---|---|---|
| EP | 0512653 A1 | 11/1992 |
| EP | 0869055 A2 | 10/1998 |
| GB | 2387107 A | 10/2003 |
| JP | 8140898 A | 6/1996 |
| JP | 2001359287 A | 12/2001 |
| WO | 0178912 A1 | 10/2001 |
| WO | 2012029056 A2 | 3/2012 |
| WO | 2012095643 A1 | 7/2012 |

OTHER PUBLICATIONS

International Search report and Written Opinion dated Nov. 25, 2014 for related Application No. PCT/EP2014/065691, filed Jul. 22, 2014.
International Search report and Written Opinion dated Nov. 4, 2014 for related Application No. PCT/EP2014/065694, filed Jul. 22, 2014.
Combined Search and Examination Report dated Jan. 7, 2015 on related UK application GB1313061.2 filed Jul. 22, 2013.

* cited by examiner

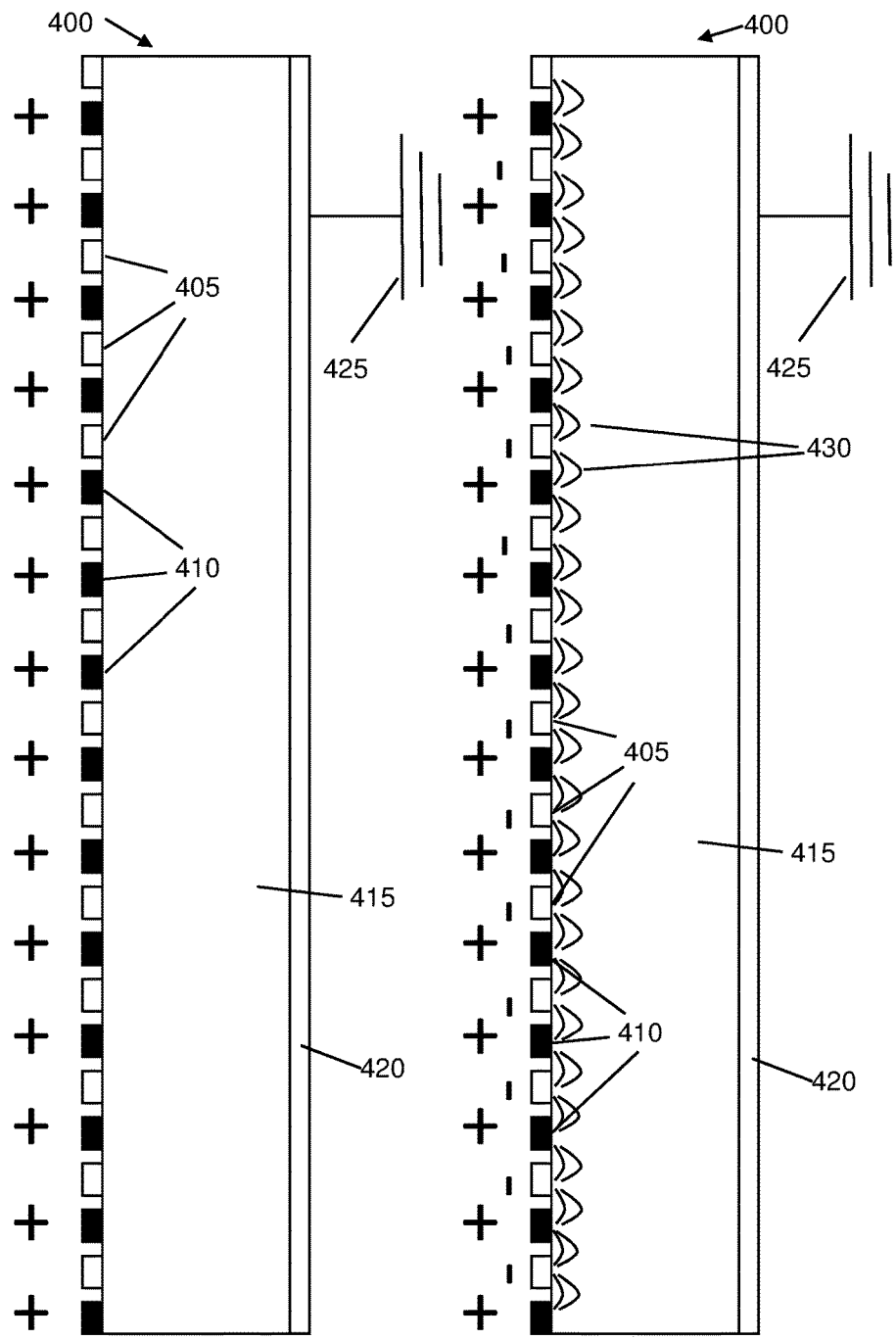
*Figure 4A*  *Figure 4B*

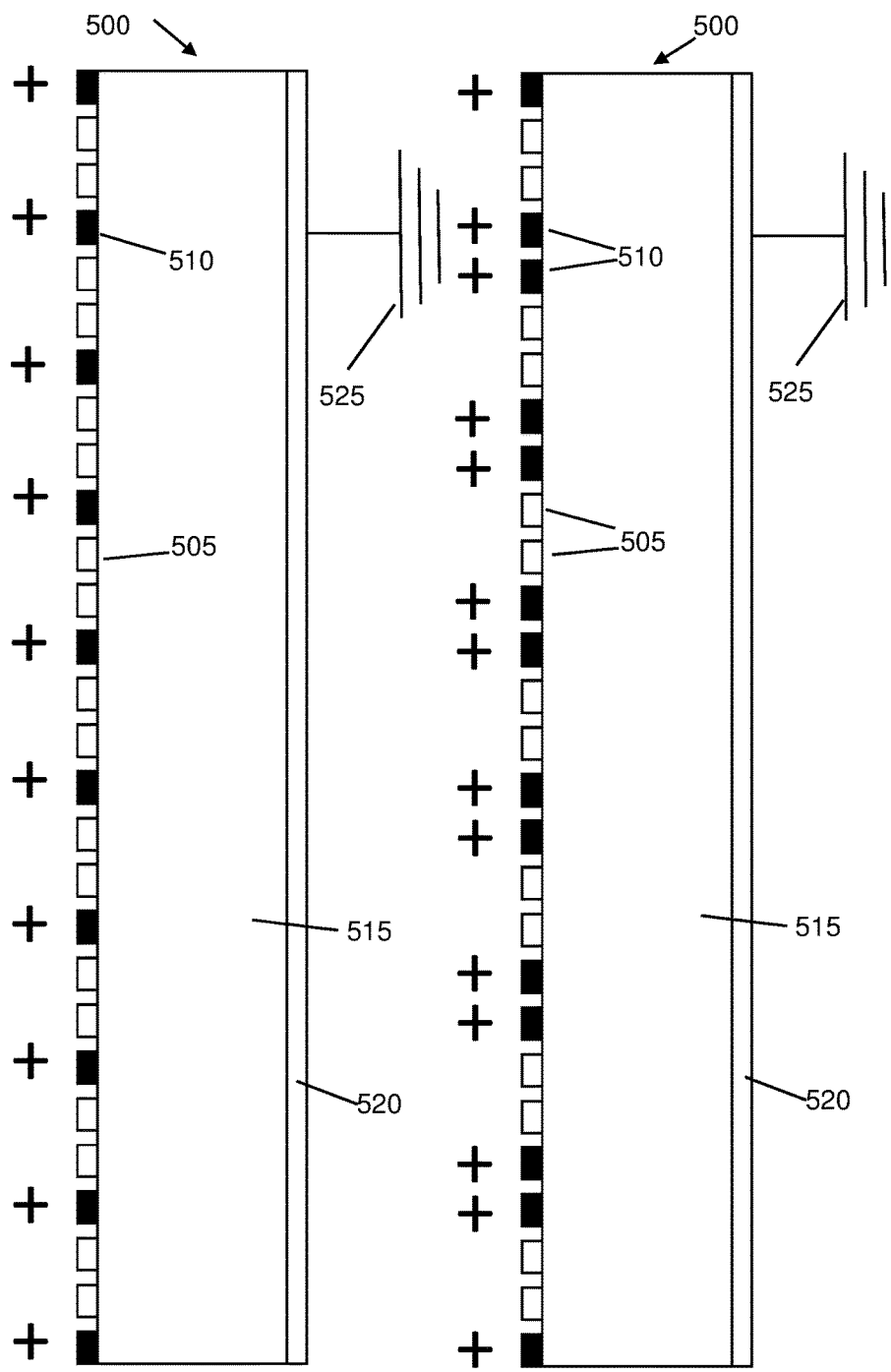
*Figure 5A*  *Figure 5B*

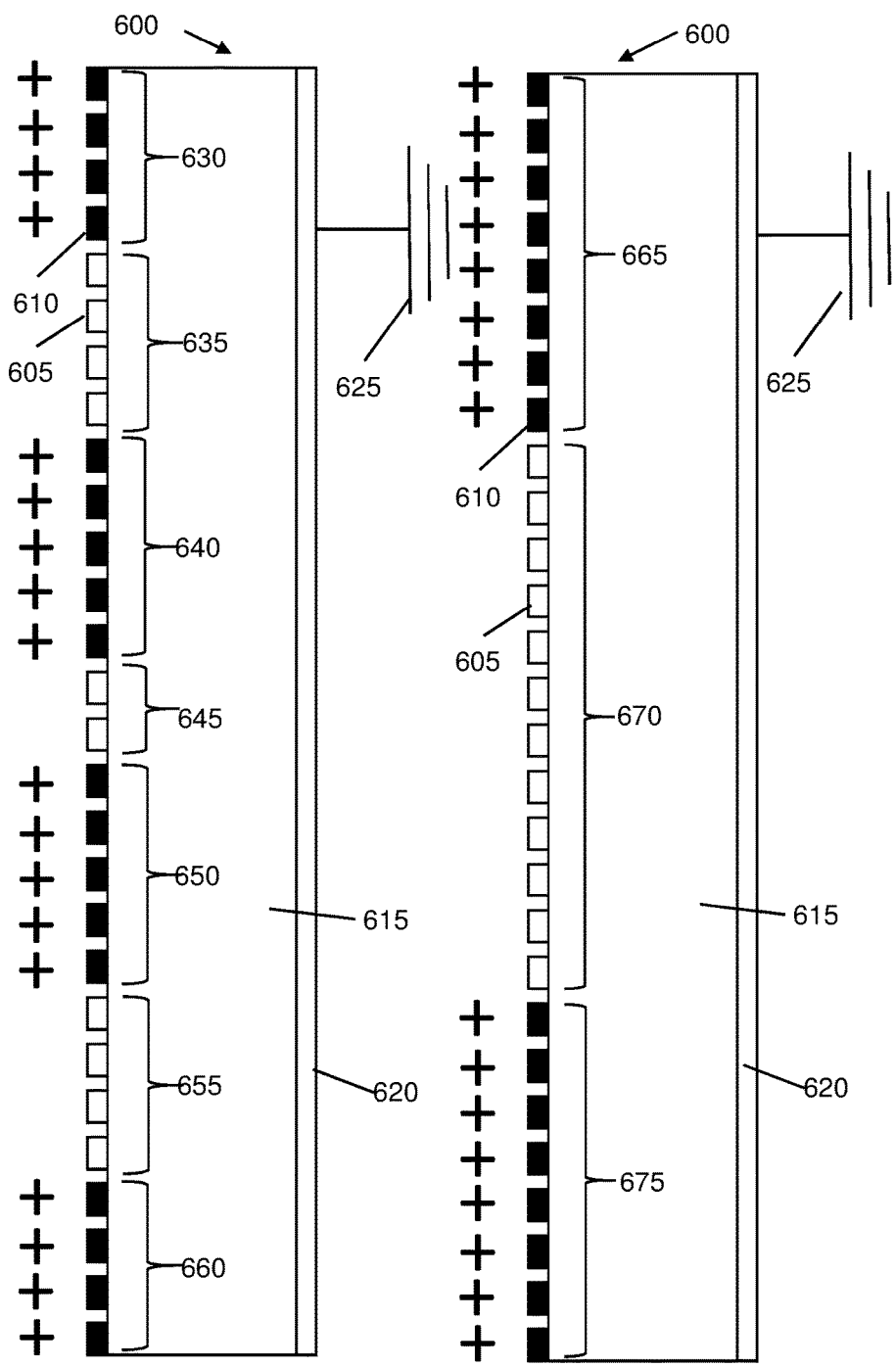
*Figure 6A*    *Figure 6B*

APPARATUS AND METHOD FOR CLEARING WATER FROM A WINDOW

CROSS-REFERENCE TO RELATED APPLICATIONS

This application is a continuation under 35 U.S.C. § 120 of International Application No. PCT/EP2014/065691, filed Jul. 22, 2014, which claims priority to United Kingdom Application No. GB 1313061.2, filed Jul. 22, 2013. The entire contents of the above-referenced patent applications are hereby incorporated by reference.

BACKGROUND OF THE INVENTION

Field of the Invention

The present invention relates to a method of, and apparatus for, clearing water from a window.

Description of the Related Technology

A window may be cleaned manually to maintain a clear view through the window. On vehicles, wipers are used to remove water droplets and to clean the window. The wipers have wiper blades which are generally manufactured from rubber or plastic and arranged to contact the window surface. The wiper blades are driven by a mechanism powered by a motor which operates to cause the wipers to sweep across the window surface. The blades wear out and need to be replaced periodically. The wiper mechanism is heavy, expensive and also subject to wear.

Commercially available products such as RainX® can be applied to the surface of a window for easier cleaning of the window. However, methods of cleaning the window that contact the surface of the window also remove products applied to the window surface when they are in use and further application of the product is then necessary.

SUMMARY

According to one aspect of the present invention, there is provided an apparatus for clearing water droplets from a window, the apparatus comprising: one or more transducers, for coupling to a window, each of the one or more transducers being operable to generate ultrasonic waves at any selected one of a plurality of different frequencies and wave-types; a generator, for providing ultrasonic drive signals to the transducer for the plurality of different frequencies; and a mode controller, for configuring the generator and transducer to generating ultrasonic waves of any selected frequency and wave type from the plurality of different frequencies and wave-types.

According to another aspect of the present invention, there is provided a method of clearing droplets of water from a window using the apparatus of any one of said one aspect, the method comprising: selecting a wave type and corresponding frequency of an ultrasonic wave, causing the generator to generate a drive signal of the selected frequency, and configuring each of the one or more transducers to operate at the selected frequency and produce the selected wave type.

It will be appreciated from the following illustrative description that the invention is capable of clearing not only water droplets for example rain and other precipitation but also droplets of water contaminated with impurities for example dirt, and water containing additives such as detergent as used in windscreen washing fluid.

According to a further aspect of the invention, there is provided an drive circuit for configuring one or more ultrasonic transducers, the drive circuit comprising a generator, for providing ultrasonic drive signals to the transducer for the plurality of different frequencies; and a mode controller, for configuring the generator and transducer to generating ultrasonic waves of any selected frequency and wave type from the plurality of different frequencies with and wave-types.

An embodiment of the drive circuit for use with an ultrasonic transducer having a plurality of electrodes, comprises an array of switches for selectively connecting the generator to the electrodes, and a mode selector for controlling the frequency of operation of the generator and for producing switch control signals for selecting the switching states of the switches.

In an embodiment of the drive circuit, the frequency generator is configured to generate in-phase signals of different frequencies and signals of the same frequencies shifted in phase by 180 degrees, and the mode controller is operable to configure the generator to produce a signal of a selected frequency and the same signal shifted in phase by 180 degrees and is operable to configure the electrodes of the transducer such that one set of electrodes receive the signal shifted in phase by 180 degrees and another set receive the in-phase signal.

BRIEF DESCRIPTION OF THE DRAWINGS

Various features and advantages of certain examples will be apparent from the description which follows, taken in conjunction with the accompanying drawings, which together illustrate, by way of example only, a number of features, and wherein:

FIG. 4A is a schematic diagram of a side view of a transducer showing an example of a configuration of electrodes;

FIG. 4B is a schematic side view of a transducer showing another example of a configuration of the electrodes of the transducer;

FIGS. 5A-B are schematic diagrams of a side view of a transducer showing other examples of configurations of the electrodes of the transducer;

FIGS. 6A-B are schematic diagrams of a side view of a transducer showing further examples of configurations of the electrodes of the transducer;

DETAILED DESCRIPTION OF CERTAIN INVENTIVE EMBODIMENTS

Figure 1:
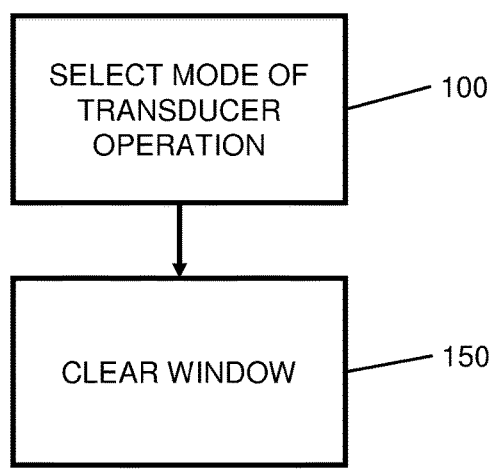
FIG. 1 is a flow chart showing an example of a method for clearing a window.

Certain examples described herein relate to a method of, and apparatus for, clearing a window. The apparatus includes a transducer that is arranged to emit ultrasonic waves which propagate along the surface of, or through, the window. Certain examples described herein relate to ultrasonically clearing precipitation from a window. The term "precipitation" is intended to include: rain, sleet, snow, ice, drizzle, mist, fog, hail or other types of precipitation. The ultrasonic waves clear the precipitation from the window. The transducer may be bonded to a surface of the window.

For ease of explanation the following description refers to water droplets. Clearing the water droplets may involve one or more of vibration, propulsion and/or atomization of the water droplets from the surface of the window using ultrasonic waves. However, examples of the invention may be used to clear other liquids from a window, for example: liquid deposits such as mixtures or solutions of water and other substances or oil. Solid deposits may be removed from a window by spraying or washing with water, or a mixture or solution of water and additives for example detergent, and then ultrasonically clearing the window.

The window may optionally comprise heating elements. In certain cases the window may be a window of a building or a window of a vehicle. For example, where the window is a window for a vehicle, the window may be manufactured from automotive glass. The window may be a window for a vehicle such as a front windscreen, rear window, sun-roof or side window of a vehicle. The window may comprise a laminate layer wherein the laminate layer is sandwiched between a top and bottom layer of glass. For example, the laminate layer may be a polyvinyl butyral (PVB) lamination that is compressed between two layers of annealed glass.

Certain examples described herein relate to clearing water from a laminated windscreen or rear window of a vehicle. The water is ultrasonically cleared from the laminated windscreen or rear window.

The term "ultrasonic" or "ultrasonically" is used to refer to waves having an ultrasonic frequency. An ultrasonic frequency is considered to have a frequency approximately within the range of 100 kiloHertz (kHz) to 50 MegaHertz (MHz) or higher. The ultrasonic waves are emitted from a transducer coupled to a signal generator. The generator may be a signal generator configured to provide an electrical signal of ultrasonic frequency to the transducer. The transducer is arranged to be driven for generating ultrasonic waves based on the ultrasonic signals from the generator.

In certain examples described herein, a transducer is configured such that it is capable of emitting frequencies within the frequency range of 100 kHz to 4 MHz, or higher frequencies. Clearing a window may be achieved using one or more transducers.

Each of the one or more transducers described herein comprises a plurality of electrodes. The electrodes of each transducer are configured such that each electrode may be operated individually from the other electrodes. As such, the transducer can be configured to operate at a frequency within the range of possible ultrasonic frequencies. The selection of a frequency is achieved by generating an electrical signal of that frequency at the signal generator and applying that signal to a "set" of the electrodes having a spacing corresponding to that natural frequency. The term "a", "one" or "single" frequency used throughout this description should be interpreted as relating to a central frequency or main frequency emitted from the transducer, since a band of frequencies will be emitted having a bandwidth around a central frequency.

The frequency and/or a wave-type of the ultrasonic waves may be dynamically selected. A combination of a frequency and a wave type is referred to herein as a mode of operation. Examples of different surface acoustic wave-types include Rayleigh waves, Lamb waves and plate waves. Certain ranges of frequencies may have a preferred wave-type, and vice versa. For example, Rayleigh waves may be generated at higher frequencies above approximately 2.5 MHz; Lamb waves may be generated at medium frequencies at approximately 1 MHz to 2.5 MHz; and plate waves may be generated at lower frequencies below approximately 1 MHz.

The one or more transducers described herein provide the ability to select the frequency and/or wave-type of the ultrasonic waves emitted from the one or more transducers. The operating mode of each transducer is therefore dynamic since the operating conditions of each transducer may be dynamically selected. Hence, each transducer is a "multimode" transducer since there are multiple operating modes available for each transducer.

Certain examples will now be described with reference to the Figures. Use of the same reference numeral in a set of Figures for a particular feature relates to the same feature.

An example method for clearing a window is shown in the flow chart of FIG. 1. At block 100 the mode of operation is selected. The mode of operation relates to the transducer operation and the mode may be selected based on operation of particular sets of electrodes of the transducer. Each electrode of the transducer may be individually connected to the signal generator for independent operation of each electrode. The independent selection of the electrodes to be connected to the signal generator gives the ability to dynamically control the selected operating frequency of the transducer. For example, the electrodes may be connected individually, or in consecutive groups, or some electrodes may not be connected at all. For example, every other electrode along the transducer may be connected wherein alternate electrodes are operated and thus active and the remaining electrodes are not operated and are thus inactive. A desired operating frequency of the transducer may therefore be achieved based on selection of the mode of transducer operation, i.e. based on the sets of electrodes selected for operation and the signal frequency from the generator. At block 150 the window is cleared based on the mode of operation chosen. The window is cleared by the ultrasonic waves emitted from the transducer for the selected mode of operation, i.e. with the desired frequency or frequencies and/or wave-types at that mode of operation.

Figure 2A:
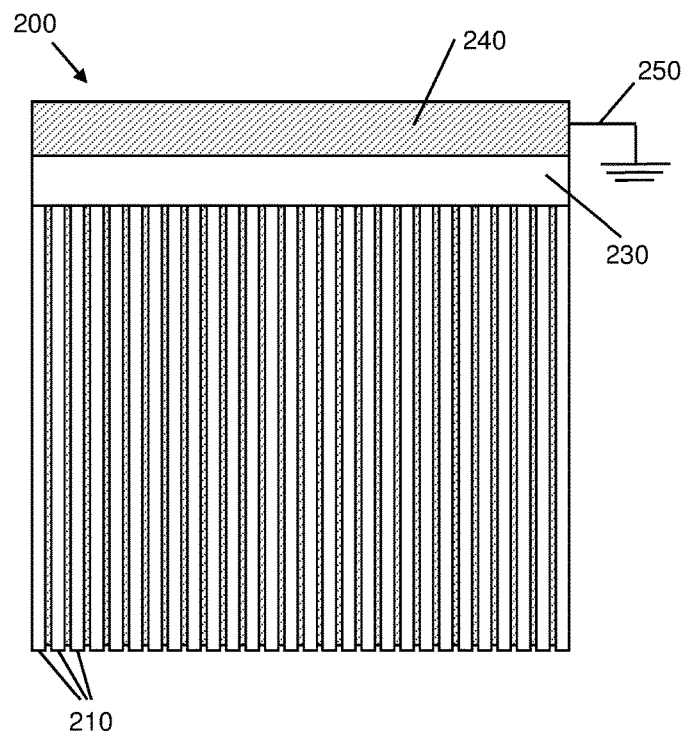
FIG. 2A is a schematic diagram of an example of a transducer.
Figure 9A:
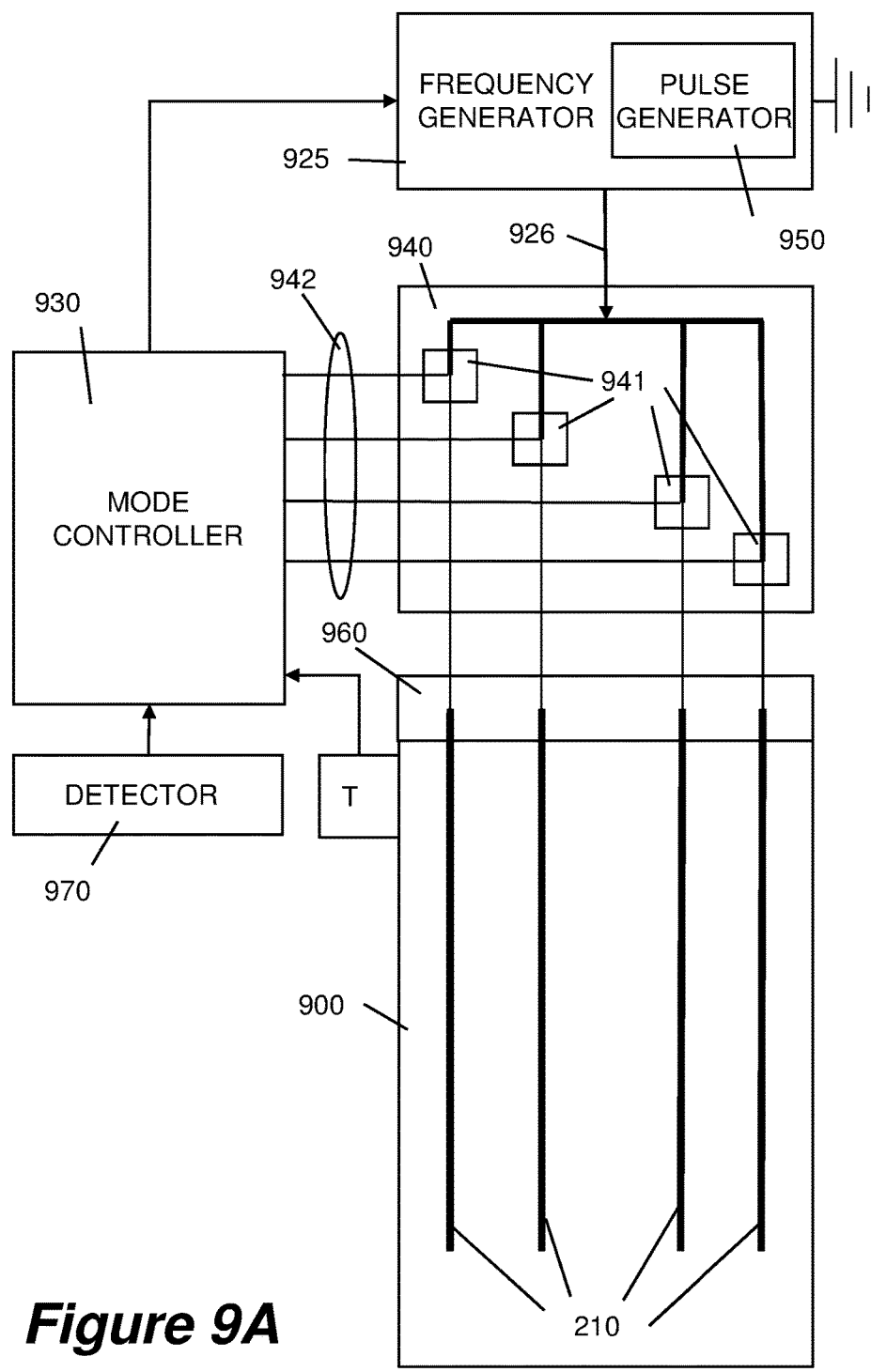
FIG. 9A is a schematic diagram of an example of a transducer and associated circuitry for controlling and operating the transducer.
Figure 9B:
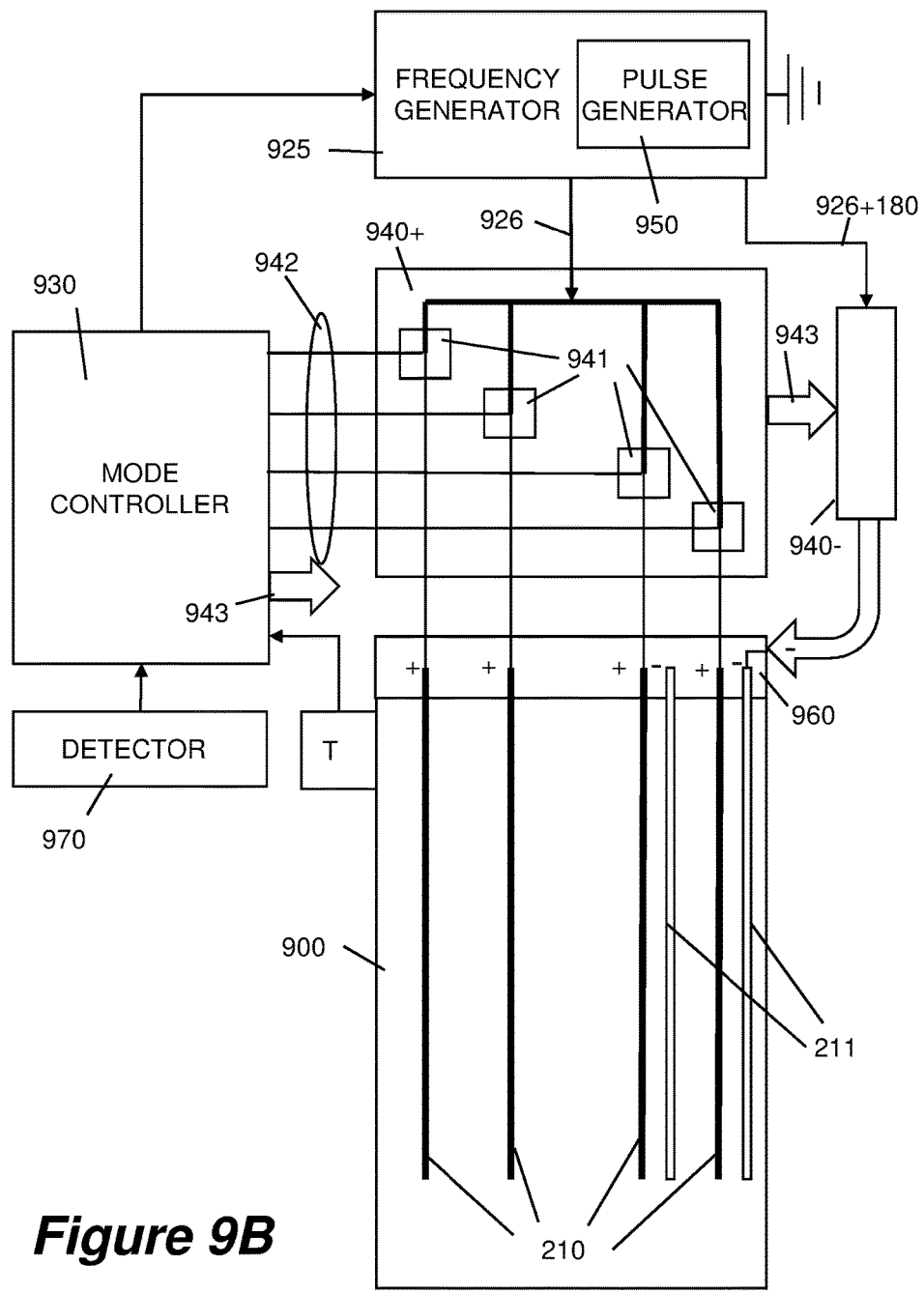
FIG. 9B is a schematic diagram of another example of a transducer and associated circuitry for controlling and operating the transducer.

FIG. 2A shows a transducer 200 having a plurality of electrodes 210. Each electrode has its own connector which provides electrical connection a frequency generator and switching circuit as will be described later with reference to FIGS. 9A and 9B. A shielding strip 230 electrically isolates the electrodes 210 from a ground plane 250. The piezoelectric material 240 of the transducer may be of a lead zirconate titanate (PZT) material or any other suitable piezoelectric material, for example quartz crystal. The electrodes 210 may have the physical appearance of electrode "fingers" running along the piezoelectric layer. A further electrode on the opposite side of the piezoelectric layer, from the electrode fingers, is electrically connected to ground 250. The further electrode may or may not have the physical appearance of an electrode "finger" since instead it may be an electrode "sheet" on the piezoelectric material on the opposite side to the individual electrodes.

Figure 2B:
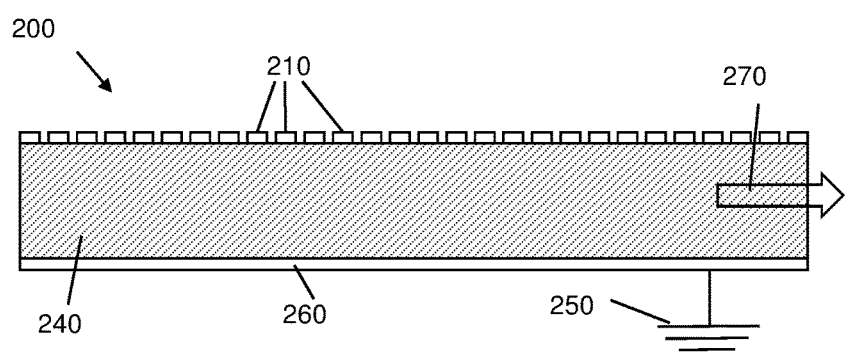
FIG. 2B is a schematic a side view of the transducer of FIG. 2A.

FIG. 2B shows a side view of the transducer described with reference to FIG. 2A. The further electrode 260 is shown electrically connected to ground 250. When the transducer is operated the signal generator applies a signal of the required frequency to a set of electrodes chosen for that frequency and the coupling of the electrodes to the piezoelectric layer causes the transducer to emit ultrasonic waves. The ultrasonic waves are emitted in a direction that is perpendicular to the electrode fingers, for example in the direction indicated by the arrow 270.

The transducer may be coupled to a window by attaching the transducer to a surface of the window. Attaching the transducer to the window surface may be achieved via chemical bonding, or physical fixing, of the transducer to the window surface. Suitable bonding agents may be commercially available, for example this may include epoxy resin. In use the bonding agent forms a bonding layer between the transducer and window surface. This bonding layer may be thin, have a uniform thickness and be free from gas bubbles, for example being prepared under vacuum conditions. The transducer may be attached to a window with its electrode "fingers" 210 facing the window surface, or alternatively attached such that its electrode "fingers" 210 face away from the window surface. Having electrodes 210 facing the window increases the wave energy applied to the window but also increases the difficulty of providing electrical connections to the electrodes for example via the electrode connectors.

Examples of the mode of operation of the transducer will now be described. In examples described herein the transducer may be configured to operate at any frequency selected from the range of frequencies from 100 kHz to 4 MHz or higher, suitable for use with glass of specific physical properties; in this example automotive glass of a windscreen. The frequency is selectable based on the selected frequency of the electrical signal produced by the signal generator and the selection of particular sets of electrodes of the transducer. For example, in certain examples the sets of electrodes may be configured for a frequency to be selected from any one frequency around 220 kHz, 570 kHz, 1.39 MHz, 2 MHz or 3.1 MHz.

Frequencies around those values may be used; for example 220 kHz plus or minus 50 kHz, 570 kHz plus or minus 50 kHz, 1.39 MHz plus or minus 100 kHz, 2 Mhz plus or minus 100 kHz and 3.1 MHz plus or minus 100 kHz.

Figure 4C:
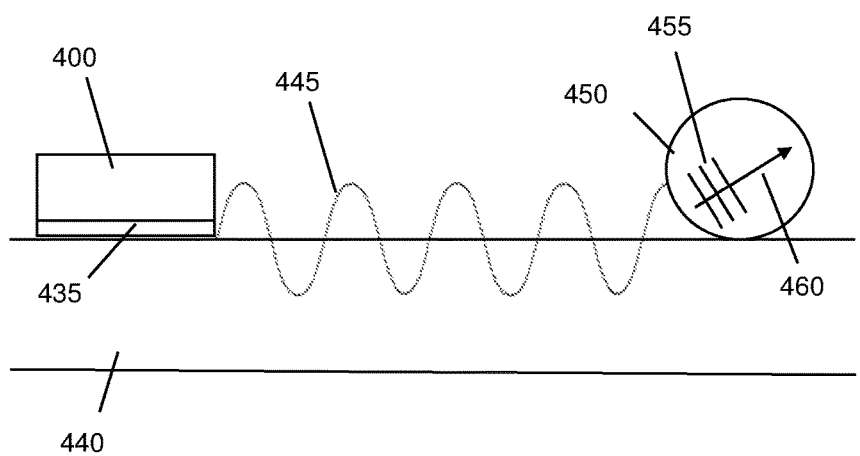
FIG. 4C is a schematic illustration showing by way of example a transducer emitting ultrasonic waves along a surface of a window towards a water droplet on the window for mode conversion.

The selection of each of these example frequencies will be described later with reference to FIGS. 4A/B, 5A/B and 6A/B. It should be noted that the frequencies that may be selected based on using different sets of electrodes described herein should in no way be considered limiting, since it is envisioned that any frequency may be selectable. The selection of any one frequency within the range of frequencies should be possible based on a transducer that is fabricated and configured for the predetermined frequency selection. The operating frequency is then selectable based on the methods described herein by operation of different sets of electrodes. However, the invention is not limited to only the selectable frequencies described herein.

Figure 3A:
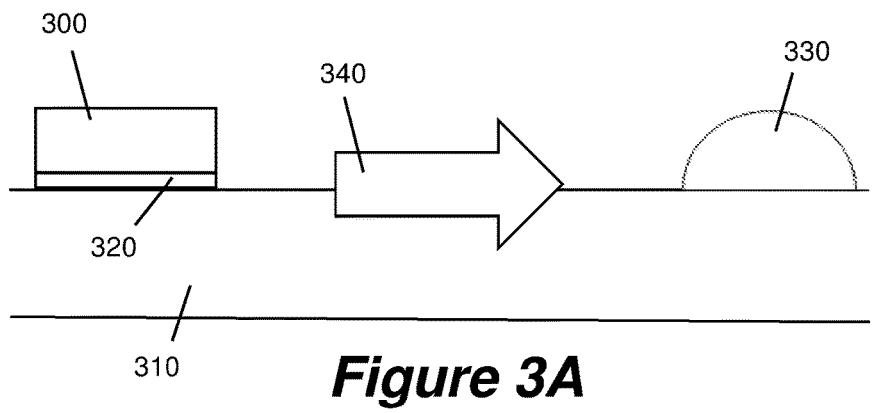
FIGS. 3A-C are schematic illustrations of a transducer emitting ultrasonic waves towards a water droplet on a window.
Figure 3B:
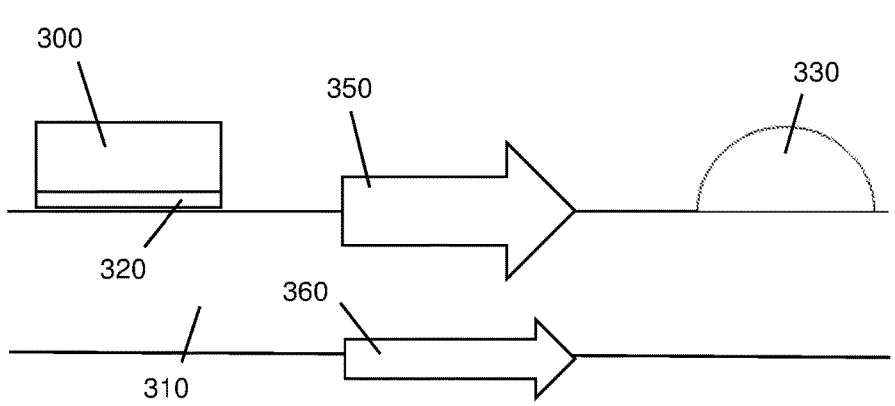
Figure 3C:
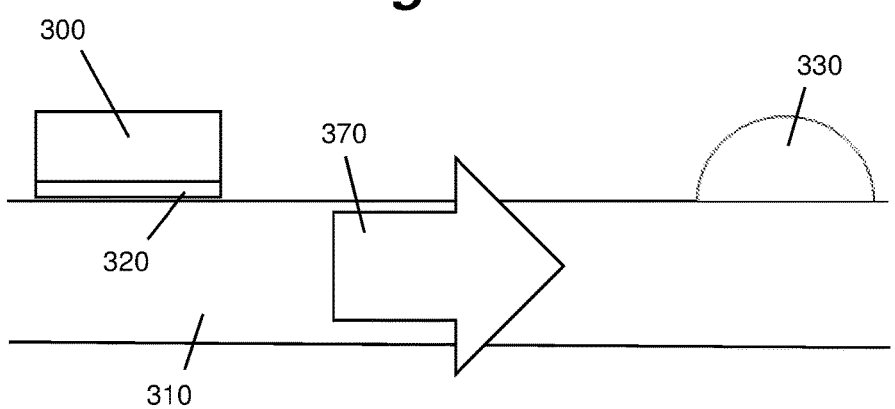

FIGS. 3A-C show examples of the different wave-types that may be ultrasonically emitted from the one or more transducers during operation.

In the example of FIG. 3A, a transducer 300 is bonded to the surface of the window 310 by a bonding layer 320, for example epoxy resin. A water droplet 330 may be present on the surface of the window. The transducer is capable of being driven to emit ultrasonic waves that propagate only through the surface of the window. The ultrasonic waves in this example are surface acoustic waves, such as Rayleigh waves 340. The Rayleigh waves emitted from the transducer may be generated at higher frequencies above approximately 2.5 MHz. The Rayleigh waves propagate along the surface of the window towards the water droplet. Since the ultrasonic waves are coupled to the surface of the window the waves may encounter the water droplet on the window surface. Since the ultrasonic waves are of a particular frequency (and hence particular wavelength) when they arrive at the water droplet(s), the ultrasonic waves "see" the water droplet and energy is transferred from the ultrasonic waves to the water droplet to clear the water droplet from the window surface. Atomization of the water droplet(s) on the surface of the window is achieved by efficient transference of the higher energies of the ultrasonic waves, to the water droplet(s). In this example, the water droplet may be cleared by the process of atomization or propulsion. The water droplet may be atomized to completely or partially remove it from the surface of the window. If partially atomized the remaining water droplet may be cleared by the further process of propulsion or vibration. For example, the water droplet may be propelled along the surface of the window to move the water droplet away from obstructing a clear view through the window.

In the example of FIG. 3B, the ultrasonic waves emitted from the transducer are Lamb waves. The Lamb waves propagate along a surface of the window. The Lamb waves emitted from the transducer in this example may have a frequency between approximately 1 MHz to 2.5 MHz. The Lamb waves 350 propagating along the window surface to which the transducer is coupled may have a larger amplitude than the Lamb waves 360 propagating along the opposite surface of the window. The Lamb waves 350, 360 propagating at both window surfaces may be in phase or out of phase, for example the Lamb waves may be symmetric or anti-symmetric waves respectively. The Lamb waves 350 at the transducer surface may have higher displacements than the Lamb waves 360 on the opposite window surface. Therefore, most of the ultrasonic wave energy emitted from the transducer propagates through the surface of the window upon which water droplets may be present. In this example, the water droplet may be removed by propulsion of the water droplet along the surface of the window. If enough energy is transferred from the Lamb waves 350 to the water droplet via, for example mode conversion, it may be possible to clear the water droplet via atomization of the droplet.

Rayleigh and Lamb waves co-exist at various frequencies. At a frequency of say 1 MHz mostly Lamb waves are present and at say 3.1 MHz mostly Rayleigh waves are present. As the frequency increases the type of waves changes progressively from Lamb waves to Rayleigh waves, i.e. Lamb waves may dominate at lower frequencies but as the frequency is increased then Rayleigh waves dominate at higher frequencies.

In the example of FIG. 3C, the ultrasonic waves emitted from the transducer are plate waves 370. The frequency of the plate waves emitted from the transducer in this example may have a relatively low frequency below approximately 1 MHz. The plate waves 370 travel mainly through the body of the window. The plate waves have lower frequencies with high wavelength and therefore plate waves may only vibrate water droplets on the surface of the window. The vibration of the water droplets on the window surface may cause separate water droplets to merge and be combined to form relatively larger droplets.

The examples of FIGS. 3A-C show only one transducer coupled to the window surface, however any number of transducers may be coupled to the window surface. The one or more transducers may be coupled near the edge of the window or in a peripheral region of the window. The one or more transducers may be hidden from view.

It should be understood that there will be a threshold or cut-off frequency above which atomization is achievable due to the higher energies of the ultrasonic waves above the cut-off frequency. Below the cut-off frequency the ultrasonic waves may not possess enough energy for atomization of the water droplets to occur, however they may possess enough energy for propulsion of the water droplet(s) across the window surface. There will also be a further cut-off frequency below which propulsion of the water droplet(s) is not achievable, however vibration of the water droplet(s) may be possible. The cut-off frequency for atomization, propulsion or vibration may depend upon the size and/or composition of the water droplet(s). By way of example, consider water droplets on the surface of the window: smaller droplets will have a larger surface area to volume ratio (in comparison to larger droplets which have a smaller surface area to volume ratio), hence the smaller droplets have a larger surface tension. Therefore smaller droplets require larger amounts of energy (from higher ultrasonic frequencies) to overcome surface tension before propulsion or atomization can be achieved, i.e. higher ultrasonic frequencies may be required to atomize and remove smaller droplets in comparison to larger droplets which may require less energy for atomization to occur.

The surface of the window may be treated, for example by applying an optional coating that may modify the surface tension between the water droplet and the window surface. For example, if an optional coating is applied to the window surface, the window surface may become hydrophobic or hydrophilic to respectively decrease or increase the surface tension between the water droplet and window surface. For example the contact angle of a water droplet may be modified by applying RainX® to the window surface. Therefore an optional coating or surface treatment to the window may modify the cut-off frequencies required for atomization, propulsion and/or vibration to occur.

As described, the electrodes of each transducer are configured such that each electrode may be operated independently from the other electrodes. The selection of a frequency and/or wave-type is achieved by operation of different "sets" of the electrodes. For example, different combinations of the electrodes may be selectively operated and some of the electrodes may optionally be selected to operate with a different phase or not operate. The electrodes selected to not operate may float electrically. If an electrode is chosen for operation then a signal voltage applied between the chosen electrode(s) and ground by the frequency generator; in contrast the electrodes that optionally do not operate are the floating electrodes that do not have a voltage applied to them. By way of example, if only half of the electrodes are operated, then the "set" will include only the half of the total available electrodes of which are operating.

FIGS. 4A-B show example modes of operation or configurations of electrode sets in a transducer, for achieving atomization of a water droplet on a window surface. In these examples, the configurations cause the transducer to emit ultrasonic waves that may have a frequency above approximately 2.5 MHz. The wave-type of these ultrasonic waves may be mainly Rayleigh waves.

In the example of FIG. 4A, the transducer 400 comprises a plurality of electrodes 405, 410. The electrodes are adjacent to a piezoelectric layer 415, for example PZT material. On the opposite side of the piezoelectric layer to the electrodes 405, 410 is a further electrode 420 electrically connected to ground 425. In operation, some electrodes 405 are floating electrodes and not connected to the signal generator, whilst other electrodes 410 are actively connected to the signal generator. The set of electrodes 410 that are connected may be operated to generate ultrasonic waves with a frequency above 2.5 MHz.

Certain physical parameters within the transducer may be selectively manufactured or fabricated to have predetermined properties. For example, the electrodes may be designed for the transducer to operate at predetermined or selected frequencies. For example, the width of each electrode and the gap or spacing between consecutive electrodes are design parameters upon which a particular frequency may depend. The transducer electrodes may be designed such that operation of different sets of electrodes causes the transducer to emit ultrasonic waves at predetermined frequencies. For example, the transducer shown in FIG. 4A comprises twenty-eight independent electrodes. Each of the twenty-eight electrodes 405, 410 shown in FIG. 4A may have a width of 0.4 millimeters (mm) with an electrode gap or spacing between the electrodes of 0.1 mm. For generating a wave having a frequency of around 3.1 MHz, a set of 14 alternate ones 410 of the 28 electrodes 410 are connected to the signal generator to receive a signal having a frequency of around 3.1 MHz with the intervening electrodes 405 floating. The spacing of adjacent active or operating electrodes 410 is related to the wavelength of the wave generated at that frequency. An electrical field may be set up between the operating electrodes 410 and the ground electrode 420 to cause the piezoelectric layer to become active for displacements of the transducer to emit ultrasonic waves.

FIG. 4B shows a transducer 400 (as similarly described in FIG. 4A), in which the electrodes 410 receive a signal of a first frequency and phase and the intervening electrodes 405 receive a signal of the same frequency but with a 180° phase shift compared to the electrodes 410. This configuration allows for an additional electrical field 430 to be set up between adjacent electrodes 410, 405. This configuration allows for the additional electrical field to cause the piezoelectric layer of the transducer to become more "active" resulting in higher displacements of the transducer, i.e. larger amplitude ultrasonic waves to be emitted. This configuration may improve the operating efficiency of the transducer and/or increase the energy transferred to water droplets on a window surface.

The examples of FIGS. 4C-F correspond to the example described with reference to FIG. 3A. A transducer 400 is bonded via a bonding layer 435 to the surface of a window 440. The transducer may be the transducer described in FIGS. 4A-B and emit ultrasonic waves having a frequency above 2.5 MHz. The ultrasonic waves emitted from the transducer during operation in the examples shown in FIGS. 4C-F are surface acoustic waves, such as Rayleigh waves. The ultrasonic waves 445 emitted from the transducer are coupled to the window surface and propagate along the surface of the window. A water droplet 450 present on the window surface may be encountered by the ultrasonic waves propagating along the window surface. On meeting the droplet, energy from the ultrasonic waves is then transferred to the droplet. This energy transfer may be based on mode conversion. The mode conversion may be stronger for higher frequencies than for lower frequencies. Mode conversion is an energy transfer process in which a mechanical wave such as an ultrasonic wave is coupled into a liquid, for example a water droplet on the window surface, and longitudinal waves 455 are transmitted into the liquid. As such, the amplitude of the ultrasonic waves incident on the water droplet will decrease as energy is transferred, and for example may be referred to as "leaky" waves. As such, the ultrasonic waves beyond the droplet may have a smaller amplitude compared to their amplitude when incident on the water droplet. The longitudinal waves transmitted into the water droplet have the effect of exerting pressure 460 on the inner surface of the water droplet such that it may cause the water droplet to be propelled along the surface of the window on which it sits or cause the water droplet to be atomized.

Figure 4D:
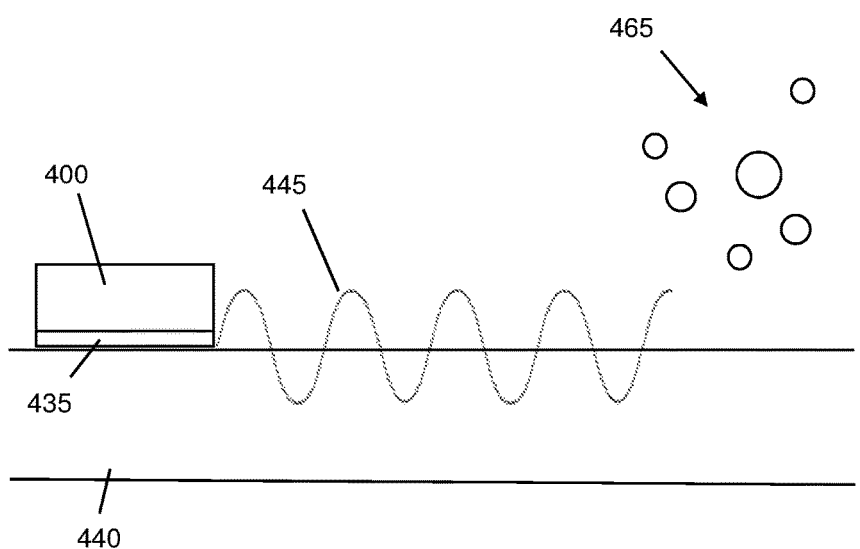
FIG. 4D is a schematic illustration showing by way of example a transducer emitting ultrasonic waves along the surface of a window to clear a water droplet from the surface of the window via atomization of the droplet.

FIG. 4D shows an example in which the water droplet on the surface of the window is atomized 465. Therefore, the window is cleared. The window is cleared by atomization of the water droplet.

Figure 4E:
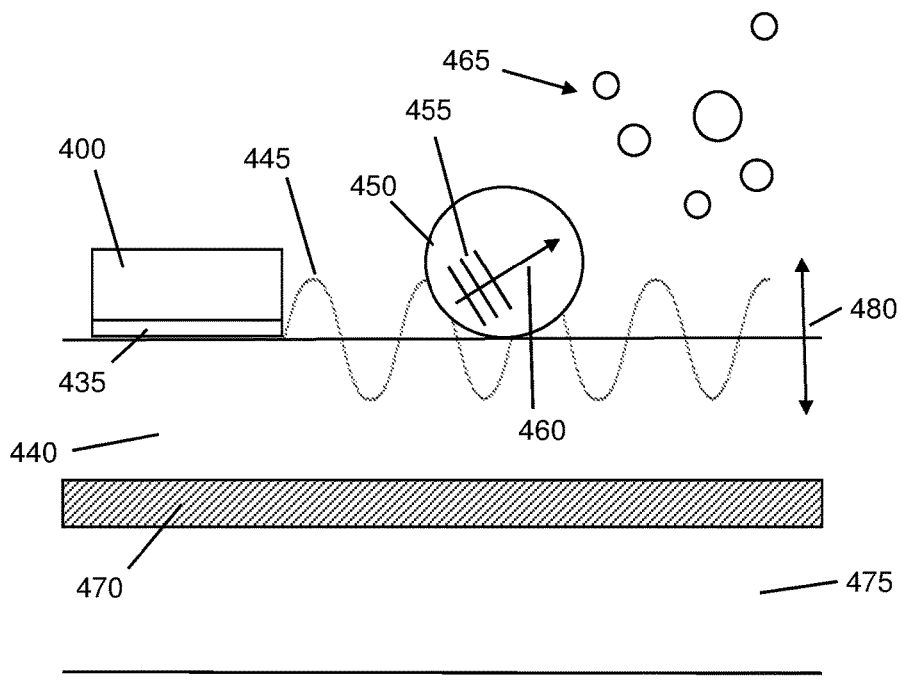
FIG. 4E is a schematic illustration showing by way of example a transducer emitting ultrasonic waves along the surface of a laminated window in which the ultrasonic waves pass through a water droplet on the window surface to clear the droplet from the window surface via mode conversion and atomization.

FIG. 4E shows an example in which the transducer is coupled to a laminated window. For example, the laminated window may be a windscreen for a vehicle. The transducer may be coupled to the window in a peripheral region or edge of the window. The transducer may be hidden from view beneath a rubber seal surrounding the window. The laminated window may comprise a laminate layer 470 sandwiched between a top 440 and bottom 475 layer of glass. During operation of the one or more transducers attached to the surface of the window, each transducer may be configured to emit ultrasonic waves that propagate only through the surface 480 of the top layer of glass 440. In this example, since the ultrasonic waves propagate substantially only through the top layer of glass, the ultrasonic waves do not propagate through the laminate layer. This is beneficial because no ultrasonic wave energy is "lost" into the laminate layer which can otherwise cause strong absorption and damping of the ultrasonic waves. Configuring the transducer to emit only surface acoustic waves has the advantage of improving the efficiency of clearing the window because attenuations in the laminate layer are prevented. All ultrasonic wave energy is confined to the surface of the window to maximize energy transfer from the ultrasonic waves to the water droplets for efficient clearing of the window.

Figure 4F:
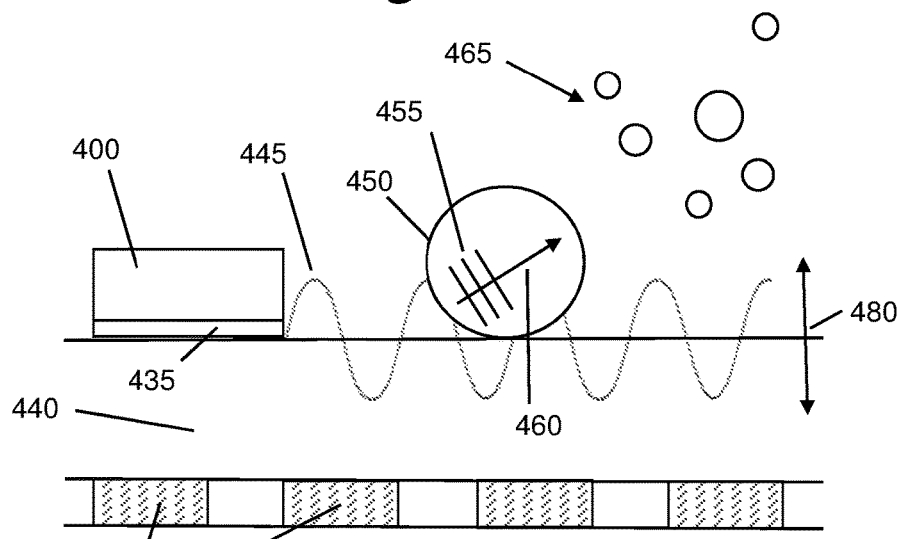
FIG. 4F is a schematic illustration showing by way of example a transducer emitting ultrasonic waves along the surface of a window having heating elements in which the ultrasonic waves pass through a droplet on the window surface to clear the droplet from the window surface via mode conversion and atomization.

FIG. 4F shows an example in which the transducer is attached to a window optionally comprising heating elements 485. For example, the window comprising heating elements may be the rear window of a vehicle. As shown, the transducer may be attached to the window surface that is opposite to the surface comprising the heating elements. During operation of the one or more transducers attached to the surface of the window, may be configured to emit ultrasonic waves that propagate only through the surface 480 of the window. As such, the ultrasonic waves do not propagate through the heating elements. Similarly to the example of FIG. 4E for the laminate layer, no wave energy is lost into the heating elements; instead all available wave energy is directed to water droplets on the surface of the window for clearing the window. The transducers 400 may also be configured to emit other wave-types, for example Lamb waves or plate waves for efficient clearing of the window as will be described later.

FIGS. 4C-F above have been described in relation to a transducer capable of emitting frequencies above approximately 2.5 MHz. The higher frequencies emitted may generate surface acoustic waves such as Rayleigh waves for clearing the window via mode conversion and atomization of water droplets on the window surface. The following section will describe other example modes of operation for the transducer, for different electrode configurations. Any electrode configuration described herein may be used for clearing any type of window, for example a plain window consisting of just a sheet of glass, a window comprising a laminate layer or heating elements or other types of windows.

FIGS. 5A-B show example modes of operation or configurations of electrode sets in a transducer, for achieving propulsion of a water droplet on a window surface. In these examples, the electrode configurations may cause the transducer to emit ultrasonic waves that may have a frequency in the range of approximately 1 MHz to 2.5 MHz. The ultrasonic waves emitted may be mainly Lamb waves.

FIGS. 5A-B show different example modes of operation for the transducer 500. Each of the FIGS. 5A-B relate to different electrode configurations. The transducer 500 comprises a plurality of electrodes 505, 510. The electrodes are on a piezoelectric layer 515. On the opposite side of the piezoelectric layer to the electrodes 505, 510 is a ground electrode 520. In operation, some electrodes 505 electrically float because they are not connected to the signal generator, whilst other electrodes 510 are connected to the signal generator to receive a signal of selected frequency. The set of electrodes 510 that are connected are operated receive a signal of, and to generate ultrasonic waves with, a frequency in the range of approximately 1 MHz to 2.5 MHz. The active electrodes 510 of FIG. 5A and in 5B are spaced to provide a natural frequency approximately in this range.

The transducer shown in the examples of FIGS. 5A-B comprises twenty-eight independent electrodes. Each of the twenty-eight electrodes 505, 510 may have a width of 0.4 mm with an electrode gap or spacing between the electrodes of 0.1 mm. In the example of FIG. 5A, the set of electrodes 510 connected to the signal generator comprises ten electrodes, such that the f floating electrodes are left unconnected in between each of the connected electrodes. This particular example of electrode configuration or mode of operation can be used to generate ultrasonic waves having a frequency of around 2 MHz. The transducer shown in the example of FIG. 5B similarly comprises twenty-eight independent electrodes. Adjacent pairs of electrodes marked + are connected to the signal generator in as shown (apart from the single electrodes at each end of the piezoelectric layer which are connected as a single electrodes pair). This electrode configuration or mode of operation can be used to generate ultrasonic waves having a frequency of around 1.39 MHz. The electrodes 505 which float in FIGS. 5A and 5B may alternatively receive a signal of the selected frequency but shifted in phase by 180 degrees relative to the electrodes 510.

Figure 5C:
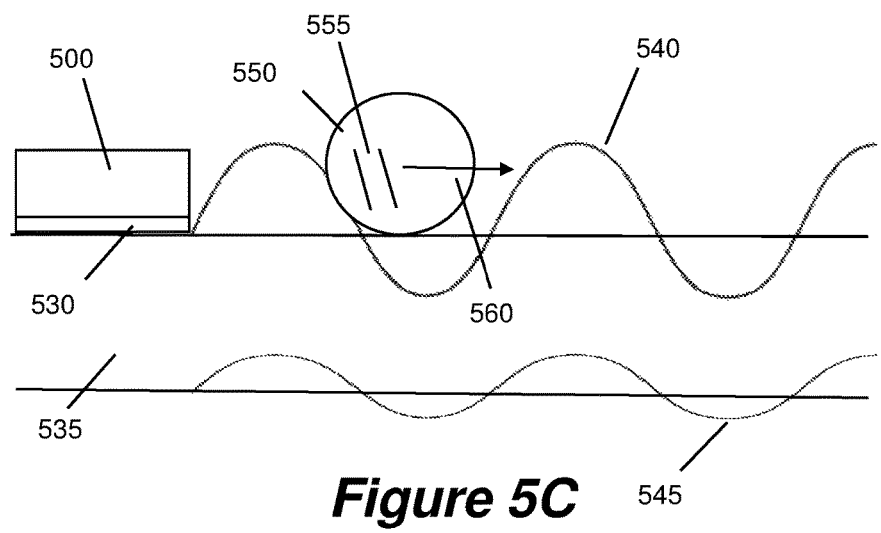
FIG. 5C is a schematic illustration showing by way of example a transducer emitting ultrasonic waves through a water droplet on a window for mode conversion.
Figure 5D:
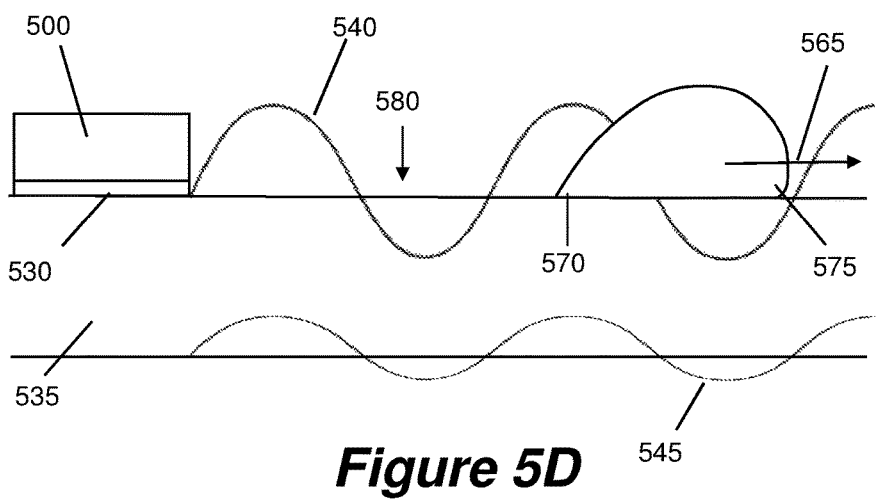
FIG. 5D is a schematic illustration showing by way of example a transducer emitting ultrasonic waves through a water droplet on a window for mode conversion to cause propulsion of the droplet along the window surface.

The examples of FIGS. 5C-D correspond to the example described with reference to FIG. 3B. A transducer 500 is bonded via a bonding layer 530 to the surface of a window 535. The one or more transducers may be the transducer described in FIGS. 5A-B and emit ultrasonic waves having a frequency in the range of approximately 1 MHz to 2.5 MHz. The ultrasonic waves emitted from the transducer during operation in the examples shown in FIGS. 5C-D are mainly Lamb waves. The ultrasonic waves 540, 545 emitted from the transducer propagate along the top and bottom surfaces of the window. The ultrasonic waves are coupled to the window surfaces. A water droplet 550 present on the window surface may be encountered by the ultrasonic waves propagating along the top window surface to which the transducer is attached. FIG. 5C shows ultrasonic waves propagating through the water droplet in which energy from the ultrasonic waves is transferred to the water droplet, for example via mode conversion. Longitudinal waves 555 are transmitted into the water droplet. The longitudinal waves transmitted into the substance have the effect of exerting pressure 560 on the inner surface of the water droplet.

FIG. 5D shows the effect that the ultrasonic waves incident on the water droplet have on the water droplet itself. The ultrasonic waves incident on the water droplet cause the droplet to be propelled along the window surface. The direction of propulsion 565 may be in the same direction as the ultrasonic wave propagation. When the water droplet is propelled along the window surface the shape of the water droplet may change. For example, the water droplet may have a trailing end 570 and a leading edge 575 that have different contact angles with the window surface. For example, the trailing end 570 may have a larger contact angle with the window surface in comparison to the leading edge 575. The ability to propel the water droplet along the window surface allows the window to be cleared 580.

Once the water droplet is propelled along the surface, a change in the contact angle of the trailing end with the window surface may change the coupling efficiency of the ultrasonic waves into the water droplet. Hence, once propulsion begins it may be necessary to alter the mode of operation of the transducer to modify the frequency of the ultrasonic waves emitted to maintain propulsion of the water droplet. As such, clearing the window may be achieved by dynamically switching between modes of operation, i.e. different frequencies and/or wave-types of the ultrasonic waves emitted.

In the examples of FIGS. 5C and 5D, the Lamb waves 540, 350 propagating along the window surface to which the transducer is coupled may have a larger amplitude than the Lamb waves 545, 360 propagating along the opposite surface of the window. This may be beneficial should each transducer 400 of the examples of FIGS. 4E and/or 4F be configured to emit Lamb waves to clear the window. This is because the Lamb waves 545, 360 having less energy and propagating near the laminate layer 470 or heating elements 485 should not impact on the efficiency of propulsion (or atomization) for clearing the water droplets from the window, since the Lamb waves 540, 350 causing mode conversion have a larger amplitude and are not affected by the laminate layer or heating elements.

The following section will describe other example modes of operation for the transducer, for different electrode configurations.

FIGS. 6A-B show example modes of operation or configurations of electrode sets in a transducer, for achieving vibration of a water droplet on a window surface. In these examples, the electrode configurations may cause the transducer to emit ultrasonic waves that may have a frequency below approximately 1 MHz, or between approximately 200 kHz and 1 MHz. The ultrasonic waves emitted may be plate waves or vibrational waves.

FIGS. 6A-B show different example modes of operation for the transducer 600. Each of the FIGS. 6A-B relate to different electrode configurations. The transducer 600 comprises a plurality of electrodes 605, 610. The electrodes sit on a piezoelectric layer 615. On the opposite side of the piezoelectric layer to the electrodes 605, 610 is a ground electrode 620 that is electrically connected to ground 625. In operation, some electrodes 605 may not be connected to the signal generator, whilst other electrodes 610 may be connected to the signal generator. The set of electrodes 610 in this example are connected to receive a signal of, and to generate ultrasonic waves with, a frequency in the range of approximately 200 kHz to approximately 1 MHz. The single active electrodes 510 of FIG. 5A and the pairs of active electrodes in FIG. 5B are configured to have a natural frequency approximately in this range.

The transducer shown in the examples of FIGS. 6A-B comprises twenty-eight independent electrodes. Each of the twenty-eight electrodes 605, 610 may have a width of 0.4 millimeters (mm) with an electrode gap or spacing between the electrodes of 0.1 mm. In the example of FIG. 6A, the set of electrodes 610 connected to the signal generator comprises eighteen electrodes. These are connected in electrode groups of "connect 4/miss 4/connect 5/miss 2/connect 5/miss 4/connect 4" electrodes as indicated 630, 635, 640, 645, 650, 655, 660 respectively. This electrode configuration or mode of operation can be used to generate ultrasonic waves having a frequency of around 570 kHz. The electrodes 605 which float in FIGS. 6A and 6B may alternatively receive a signal of the selected frequency but shifted in phase by 180 degrees relative to the electrodes 610.

The transducer shown in the example of FIG. 6B similarly comprises twenty-eight independent electrodes with the set of electrodes 610 connected to the signal generator comprising eighteen electrodes. The electrodes shown are connected in electrode groups of "connect 8/miss 12/connect 8" electrodes along the piezoelectric layer as shown 665, 670, 675 respectively. This electrode configuration or mode of operation can be used to generate ultrasonic waves having a frequency of around 220 kHz.

Figure 6C:
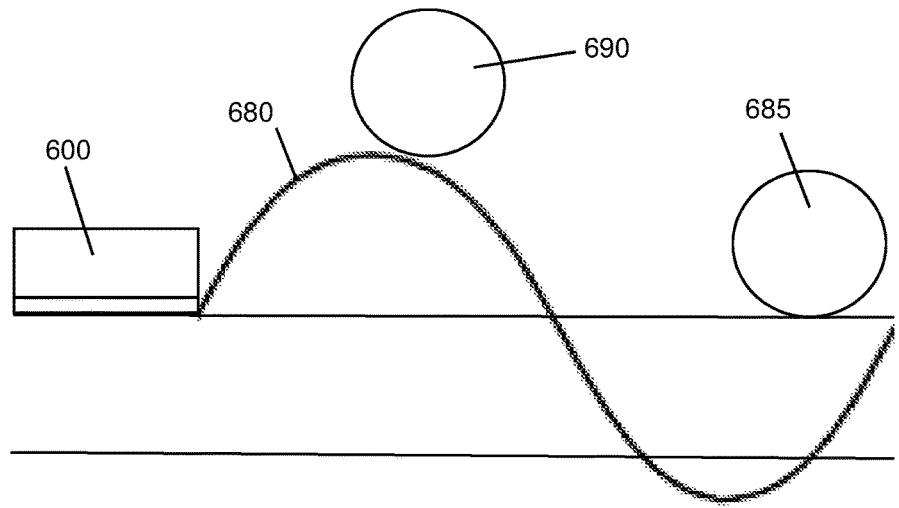
FIG. 6C is a schematic illustration showing a transducer emitting ultrasonic waves towards a droplet on a window to cause the droplet to overcome surface tension with the window surface and to leave the window surface according to an example.
Figure 6D:
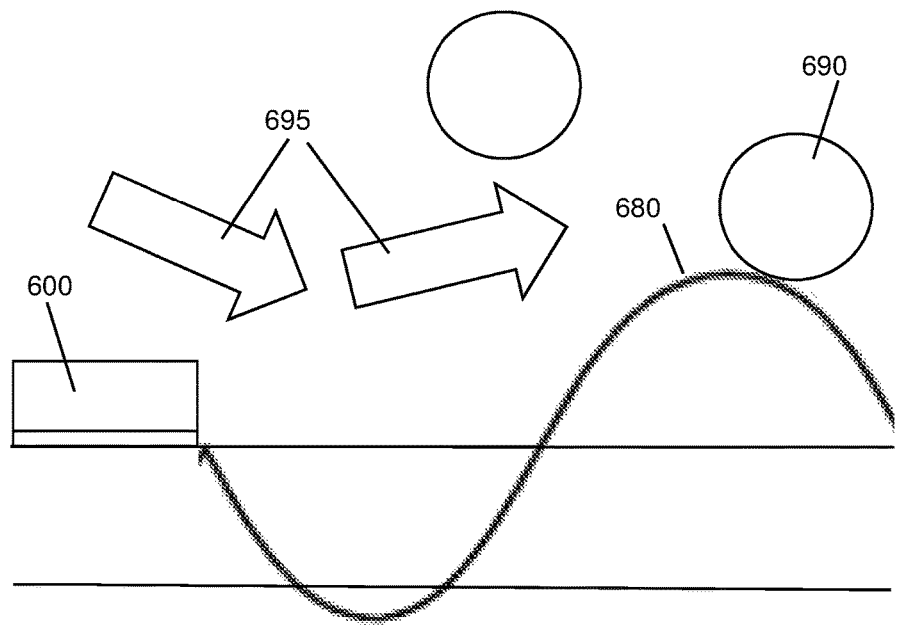
FIG. 6D is a schematic illustration showing by way of example a transducer emitting ultrasonic waves towards a water droplet on a window to cause the droplet to leave the window surface and be removed by air passing between the droplet and the window surface.

The examples of FIGS. 6C-D correspond to the example described with reference to FIG. 3C. A transducer 600 is bonded via a bonding layer to the surface of a window. The transducer may be the transducer described in FIGS. 6A-B and driven to emit ultrasonic waves having a frequency between approximately 200 kHz to 1 MHz. The ultrasonic waves emitted from the transducer during operation in the examples shown in FIGS. 6C-D are plate waves. The ultrasonic waves 680 emitted from the transducer propagate through the body of the window. The ultrasonic wave may have a frequency to match a resonant frequency or vibration frequency (resonance condition) of the window. The ultrasonic waves propagating through the body of the window cause the window to vibrate.

In the example of FIG. 6C, a water droplet 685 is shown to be present on the window surface. Vibration of the window allows for the surface tension between the water droplet and the window surface to be overcome. The water droplet on the vibrating window surface may be "kicked" or "ejected" 690 off the window surface. Therefore the water droplet(s) leave the window surface and the ultrasonic waves clear the window. Further, an air flow 695 above the surface of the window may assist in the clearing of the window. This may be achieved by moving the water droplet(s) further away from the window surface therefore reducing the chances that the water droplet(s) may land back onto the vibrating surface.

For example, each transducer 400 of the examples of FIGS. 4E and/or 4F may be configured to emit vibrational plate waves as described with reference to FIGS. 6C-D to clear the window. This may have the benefit of efficient clearing of the laminated window or window with heating elements because the plate waves have a lower frequency (hence longer wavelengths) and as such do not "see" the heating elements which are much smaller than the plate wave wavelengths.

The example modes of operation described in FIGS. 4-6 can be used to control the frequencies and wave-types of the ultrasonic waves emitted from the transducer(s), based on different configurations of the electrodes which are electrically connected to the signal generator, on different frequencies of signals produced by the generator. An example method for clearing a window using one or more modes of operation for the transducer will now be described.

Figure 7:
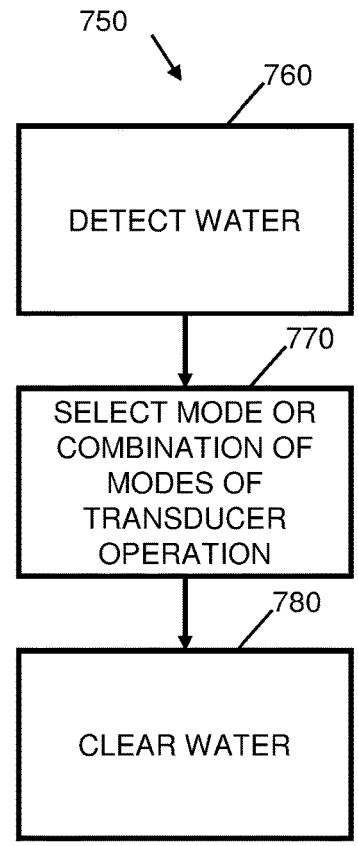
FIG. 7 is a flow chart of an illustrative method of detecting and clearing precipitation.

FIG. 7 is an example flow chart outlining a method 700 for clearing a window using one or more selected modes of transducer operation. At block 760 the presence of water droplets is detected on the window. At block 770 a mode or sequence of modes of operation is selected. It is possible to select either one mode of operation or a sequence of more than one mode of operation for clearing the window. Since the mode of operation of a transducer is based on the configuration of electrodes in the transducer that are actively connected to the signal generator, in examples of the system only one mode of operation may be operated at any one time for a single transducer. Hence, if more than one mode of operation is required for clearing 780 the window, the modes of operation must be sequentially selected.

For example, if a water droplet is to be cleared from the window surface using two modes of operation, then a first mode of operation selected may be such that the transducer is configured for emitting ultrasonic waves having a frequency at approximately 3.1 MHz, and a second mode of operation selected for configuring the transducer to emit ultrasonic waves having a frequency at approximately 2 MHz. In this example, the two modes of operation for the transducer may be dynamically alternated for configuring the transducer to first emit ultrasonic waves at approximately 3.1 MHz and to second emit ultrasonic waves at approximately 2 MHz. Of course, the choice of frequency emitted may depend upon how many water droplets are on the window surface or the size of the droplets. Other example frequencies may be used to initiate vibration of the droplet with lower frequencies and then to propel or atomize the droplet with higher frequencies.

The method for clearing the window described in FIG. 7 allows for the frequency and wave type (i.e. a mode of operation) of the ultrasonic waves emitted from the transducer to be dynamically controlled or selected. This may be beneficial for, for example, clearing ice or mud from a vehicle window. A first mode may be selected to vibrate the window and break up the ice on its surface, and a second mode selected for moving the broken up pieces of ice across the window surface to clear the window. A yet further mode may be chosen or selected for clearing melted ice or water droplets via atomization. The dynamic selection of the operating frequency of the transducer allows for different frequencies of ultrasonic waves to be emitted from the transducer in a controlled manner to propagate across the window surface, or optionally through the body of the window. A plurality of different modes of operation may be available for a single transducer based on the large number of different combinations of electrode configurations as described hereinabove.

The modes of operation may be selected sequentially using a set time delay in between selections of each mode of operation. For example, the time delay between successive modes of operation may be 5 microseconds, i.e. the frequency of ultrasonic waves emitted from the transducer(s) and the sets of electrodes may be changed every 5 microseconds. The time delay may be equally fixed or changed dynamically during operation. The time delay of 5 microseconds is only one example; other delays could be used, for example: a range of a few microseconds for example 1 to 10 microseconds. The delay may be chosen to ensure that the result of one mode on a water droplet is still active when the next mode is applied to it. The detection 760 and selection 770 of the mode(s) of operation may be manual or automatic. For example, a driver of the vehicle may manually select the mode of transducer operation based on visual observations of the water droplets or other precipitation on the window surface. Alternatively, a detection system may be configured to detect the presence of precipitation automatically. If detection is automatic at least two transducers are required: a first transducer to act as a transmitter, and a second transducer to act as a receiver. The signal generator and one or more of the transducers used for clearing precipitation may be used as the transmitter of the detection system. Alternatively, an additional, separate, transducer may be used as the transmitter. Detection of precipitation may be based on the transmitter emitting ultrasonic waves that are detected at the receiver wherein the ultrasonic waves have a "default" amplitude or signal strength which corresponds to zero water droplets or other precipitation on the window surface. If the strength of the signal received at the second transducer varies from the default signal strength, this may indicate a presence of water or other precipitation on the window surface. Where water or other precipitation is present on the window surface, energy may be transferred from the propagating ultrasonic waves to the water or other precipitation. As such, the ultrasonic waves may undergo attenuation and when the ultrasonic waves reach the receiver at the second transducer, the signal strength will be lower than the default value. Hence, the presence of water droplets or other precipitation on the window surface is detected. The level of attenuation may indicate the amount of precipitation (or water droplets) on the window surface, or the type of precipitation (for example sleet). The amount of water or other precipitation detected may be used to automatically select a mode of operation for clearing the window as described.

Figure 8:
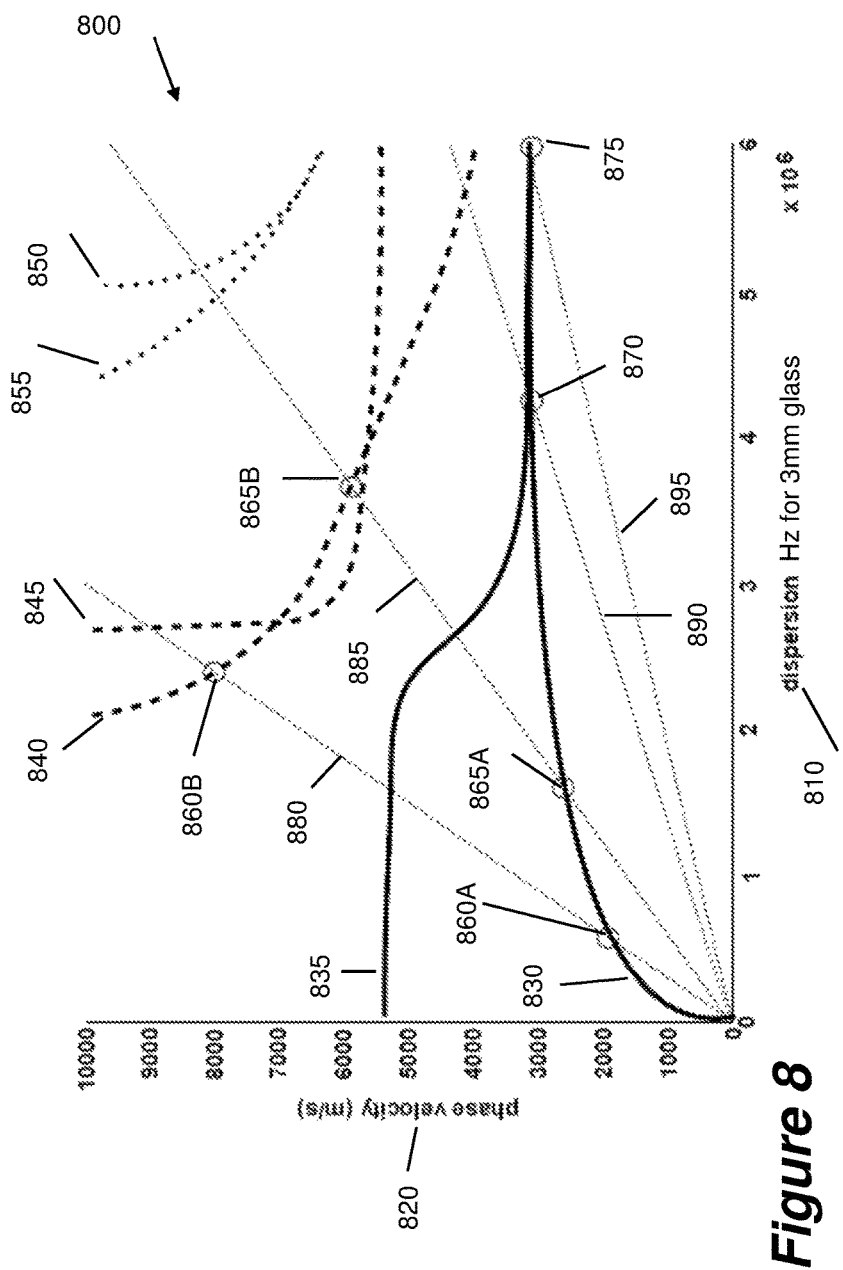
FIG. 8 is a graph showing dispersion properties for different phase velocities of ultrasonic waves on a glass substrate according to an example.

FIG. 8 is a graph 800 modelling dispersion 810 as a function of phase velocity 820 for ultrasonic waves on a glass substrate (i.e. a window). This information is useful for determining the effect that each wave-type will have on a water droplet sitting on the surface of a window. The vertical axis represents phase velocity in meters per second, m/s. The horizontal axis represents Frequency in MHz for a sheet of glass 3 mm thick, corresponding to dispersion which is measured in Hz (frequency).

In the example of FIG. 8, the ultrasonic waves modelled are surface acoustic waves. The glass substrate modelled is 3 mm thick, which is roughly the thickness of a vehicle window, or top layer of glass in a laminated windscreen. The phase velocity of ultrasonic waves propagating through bulk glass for anti-symmetric Lamb waves and for symmetric Lamb waves are given by the curves 830 and 835. For a thin sheet of glass or glass substrate, such as for a window the waves may behave differently than for bulk glass and may exhibit surface coupling or plate-wave behavior. The phase velocity of the ultrasonic waves are shown in meters per second (m/s) and the dispersion is shown in Hertz (Hz), i.e. frequency for a glass substrate which is 3 mm thick. The graph represents how the phase velocity or speed of the ultrasonic waves changes with frequency whilst propagating through the glass substrate.

FIG. 8 shows that the ultrasonic waves emitted may be first-order waves (first-mode) 830, 835, second-order waves (second-mode) 840, 845, third-order waves (third-mode) 850, 855 or higher-order waves. As shown in FIG. 8, the ultrasonic waves are Lamb waves and may be anti-symmetric or symmetric waves, i.e. out of phase or in phase respectively. The phase velocity for the anti-symmetric waves are shown by 830, 840 and 850. The phase velocity for the symmetric waves are shown by 835, 845 and 855. The frequencies of ultrasonic waves emitted for different configurations of the transducer(s) described herein are indicated on the phase velocity-dispersion relationship for the first-order mode of anti-symmetric waves (830) by 860A, 865A, 870 and 875. The phase velocity of the 570 kHz "plate" waves are shown by 860A; the approximately 1.5 MHz Lamb waves by 865A; and higher frequency "Rayleigh" waves by 870 and 875. There may be higher displacement of the transducer for lower values of dispersion, i.e. for plate waves, since the ultrasonic waves emitted for lower dispersion values have longer wavelengths. The wavelengths (λ) of the ultrasonic waves emitted that cross the dotted lines 880, 885, 890, 895 on the graph are: λ=10 mm; λ=4.9 mm; λ=2.16 mm; λ=1.55 mm respectively.

For example, the "plate" waves at 570 kHz for the first-mode anti-symmetric waves 860A have a wavelength of 10 mm, and the second-order anti-symmetric waves 860B (at a slightly higher shifted frequency) also have a wavelength of 10 mm. It can be seen that the first-order waves 860A have a slower phase velocity around 2000 m/s compared to the second-order waves which have a faster phase velocity around 8000 m/s.

By way of example, the higher frequency ultrasonic waves 870, 875 that have shorter wavelengths at 2.16 mm and 1.55 mm respectively have a wavelength close to the diameter of a typical water droplet (a few mm). Therefore, these waves are more suitable for atomizing droplets due to strong mode conversion. In contrast, the lower frequency ultrasonic waves 860A that have longer wavelengths at 10 mm will have very weak mode conversion (if any) and not be suitable for atomizing the droplet but may be suitable for vibrating the droplets. Of course, there will be a "medium" set of frequencies somewhere in between atomization and vibration that will give rise to a level of mode conversion somewhere between the very weak mode conversion of lower frequencies and strong mode conversion of higher frequencies. This graph helps to pinpoint the frequencies best suited for clearing the window of water droplets.

Example implementations of the multimode transducer(s) and associated circuitry are described herein with reference to FIGS. 9A and 9B.

Referring to FIG. 9A, a transducer, which may be one of many comprises a plurality of electrodes 210 on a piezo-electric substrate as shown in FIG. 2 for example. Each electrode 210 is connected via a connector 960 to a respective one of a plurality of binary switches 941 of a switch circuit 940. All of the switches are connected to the output 926 of a frequency generator 925. A mode controller 930 controls the frequency generator and the switch circuit. The mode controller controls the frequency of the output signal applied to the switches 941. The mode controller also selects which of the switches are conductive and which are non-conductive thereby selecting the set of electrodes 210 which receive the output signal. In this example the other electrodes electrically float. The mode controller controls the switches by for example applying binary signals to their control inputs 942. The combination of frequency and set of electrodes selected to receive the output signal defines the selected mode of operation of the transducer as described above.

The frequency generator may additionally include a pulse generator 950 which pulses the output signal 926 on and off with a desired mark-space ratio to reduce heating of the transducer. The pulsing of the output signal 926 may be controlled by the controller 930. The pulsing may be controlled in dependence on the temperature of the transducer as measured by a sensor T.

FIG. 9B differs from FIG. 9A in that the electrodes 211 which float in FIG. 9A receive the output signal 926 of the frequency generator shifted in phase by 180 degrees. For that purpose the frequency generator has a further output 926+180 and an additional switch circuit 940—which selects the other electrodes 211 under the control of the mode controller 930 which has an additional control port 943 for controlling the additional switch circuit 940-. Thus the system of FIG. 9B can select any electrode of the transducer to receive the signal 926 or the signal 926 shifted by 180 degrees.

The selection of the mode may be done manually by an operator, for example the driver of a vehicle, as described above with reference to FIG. 7.

The selection of the mode may be done automatically using a detector 970 which detects the amount of water on the window, as described above with reference to FIG. 7.

FIGS. 10A and 10B schematically illustrate the clearing apparatus of the present invention installed on a vehicle.

The example of FIG. 10A shows a clearing apparatus 1000 attached to a vehicle window 1030. The clearing apparatus comprises one or more multimode transducers 1010 as described herein. In this case, the vehicle window is a windscreen which may be a laminated window. A plurality of transducers 1010 are attached to a peripheral region of the window and may optionally be hidden from view beneath a rubber seal. The transducers are driven to emit ultrasonic waves 1020 that are coupled to the window surface and propagate across the window surface. The direction of propagation in this example is in a direction that is perpendicular to the transducer electrodes. Precipitation 1040 on the surface of the window may be cleared according to methods described herein, for example via vibration, propulsion and/or atomization. The transducers may be arranged along the edge of the window in a linear fashion such that ultrasonic waves may propagate across the entire window surface. The location of attachment of the transducers allow precipitation to be cleared from any region of the window surface. The transducers are attached to the window to permit an unobstructed view through the window for the driver of the vehicle and preferably also the front passenger. In the example shown the transducers are attached at the top of the window. They may be elsewhere on the periphery of the window. The clearing apparatus 1000 may optionally be attached to other windows of the vehicle, for example a side window 1050 and/or a rear window.

Figure 10A:
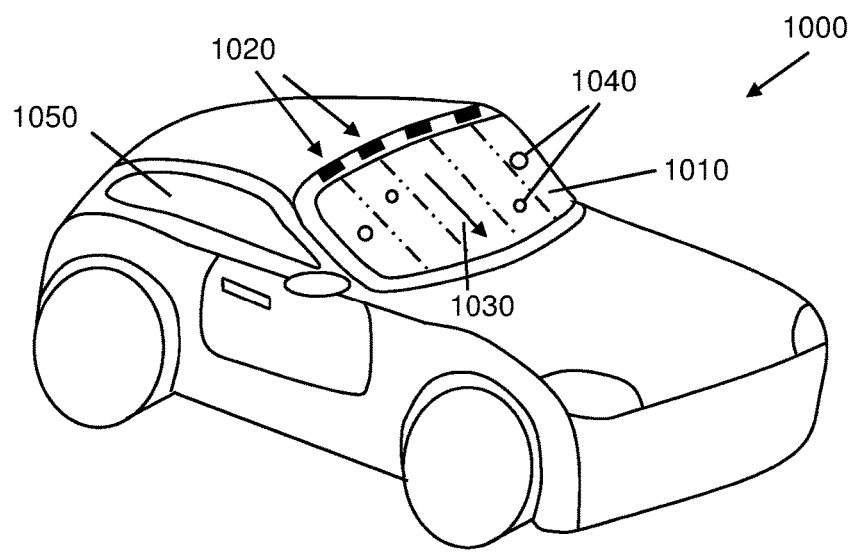
FIGS. 10A and 10B are schematic diagrams of a vehicle having a windscreen to which transducers are attached.
Figure 10B:
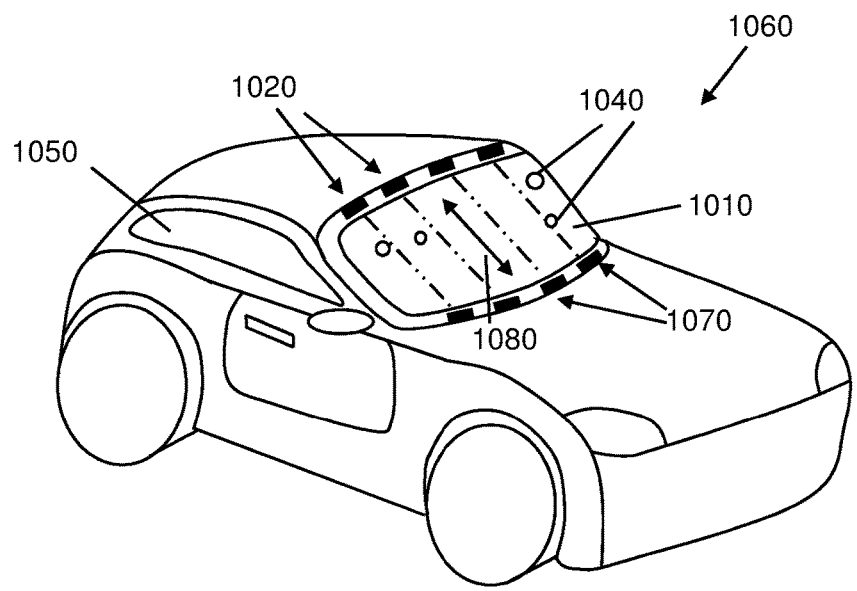

FIG. 10B shows an example apparatus 1060 for detecting and clearing precipitation on the vehicle window. In this example, one or more of the plurality of transducers 1010 attached to the window may act as transmitters and one, or more, further transducers 1070 may act as receivers, as described above with reference to FIG. 7. Ultrasonic waves 1080 propagating across the window are transmitted and received by the transducer(s) 1070. The presence of precipitation may thus be detected. Water droplets are then automatically cleared from the window as previously described hereinabove.

The examples described herein above provide a robust method of clearing water droplet(s) from a window surface. The combination of a transducer having many electrodes and the selection of different combinations of electrodes and frequencies of operation allow a wide selection of modes of operation. The modes may be selected automatically. In the examples described herein, a single transducer may be dynamically configured to emit ultrasonic waves separately at a plurality of different frequencies, for example at five different frequencies for the different configurations of electrodes. However, it is to be understood that many more frequencies may additionally be selected.

The invention as described by way of example above, operates the transducers at one selected frequency at one time. However, a transducer may be designed to be operable at a fundamental frequency and one or more harmonics of that frequency at the same time.

The selection of the modes of operation allows selection of modes in which most of the ultrasonic wave energy emitted from the transducer propagates through the surface of the window upon which water droplets may be present. This allows efficient removal of the droplets for clearing the window surface.

Whilst the invention has been described by way of example with reference to windows, especially windows of vehicles, it may be used to clear precipitation from visors used by drivers of vehicles which do not have windscreens, for example motorbikes. Other examples of use include external mirrors of vehicles Whilst the invention has been described by way of example with reference to clearing precipitation, in particular droplets of water, it may be used to clear other water droplets which may include additives such as detergent and/or de-icer used for washing a window; for example screen wash applied to a windscreen. Dirt and other contaminants may be removed from a window by washing with water, or water plus detergent, and then using the present invention to clear the contaminated water.

The preceding description has been presented to illustrate and describe examples of the principles described. This description is not intended to be exhaustive or to limit these principles to any precise form disclosed. Many modifications and variations are possible in light of the above teaching. The features described with reference to a particular example should not be considered limiting to that particular example but instead may be combined or incorporated with any of the examples described herein.

What is claimed is:

1. An apparatus for clearing liquid droplets from a window, the apparatus comprising:
   one or more transducers configured to be coupled to a window, each of the one or more transducers being configured to generate ultrasonic waves at any selected one of a plurality of different frequencies and wave-types;
   a generator configured to provide ultrasonic drive signals to the one or more transducers for generating the ultrasonic waves at any selected one of the plurality of different frequencies and wave-types;
   and a mode controller configured to control the generator and the one or more transducers;
   the mode controller comprising a mode selector configured to dynamically select, during operation of the apparatus, at least one mode of operation from a plurality of modes of operation available for the transducers,
   each mode of operation corresponding to a particular combination of a frequency and wave type.

2. The apparatus according to claim 1, wherein the plurality of different frequencies are within the frequency range of over 100 kHz.

3. The apparatus according to claim 1, wherein each of the one or more transducers comprises a plurality of electrodes and the mode controller is configured to select different sets of the plurality of electrodes of each of the one or more transducers to generate ultrasonic waves of different frequencies and wave types.

4. The apparatus according to claim 3, wherein the mode selector is configured for selecting a frequency and wave type and the mode controller further comprises a switching circuit for selecting the different sets of the plurality of electrodes.

5. The apparatus according to claim 1, wherein the mode controller is configured to control the one or more transducers and generator to successively operate at different ones of the selected frequencies and wave types.

6. The apparatus according to claim 1, wherein the mode controller is configured to change from one configuration of the generator and the one or more transducers to another with a time delay between the configurations.

7. The apparatus according to claim 1, wherein the generator is configured to apply the ultrasonic drive signals to the one or more transducers in pulses.

8. The apparatus according to claim 1, further comprising: a control system, having a detector configured to sense ultrasonic waves emitted by at least one of the one or more transducers for detecting an amount of attenuation on the window, wherein the mode selector is configured to control the generator and the one or more transducers based on the detected amount of wave attenuation.

9. The apparatus according to claim 1, further comprising the window and wherein the one or more transducers are fixed to an outer surface of the window.

10. The apparatus according to claim 9, wherein the window comprises a window for a vehicle.

11. The apparatus according to claim 9, wherein the window comprises a laminated window comprising a laminate layer sandwiched between a top and bottom layer of glass.

12. The apparatus according to claim 1, wherein the plurality of modes of operation available for the one or more transducers comprises:
   a mode for achieving atomization of liquid droplets on the window;
   a mode for achieving propulsion of liquid droplets on the window; and
   a mode for achieving vibration of liquid droplets on the window.

13. The apparatus according to claim 1, wherein the modes of operation are available for sequential selection.

14. The apparatus according to claim 1, further comprising a detector configured to detect an amount of water on the window, wherein the mode selector is configured to control the generator and the one or more transducers based on the detection.

* * * * *